United States Patent [19]

Miller

[11] 4,053,204
[45] Oct. 11, 1977

[54] OPTICAL FIBER HAVING REDUCED DISPERSION

[75] Inventor: Stewart Edward Miller, Locust, N.J.

[73] Assignee: Bell Telephone Laboratories, Incorporated, Murray Hill, N.J.

[21] Appl. No.: 710,136

[22] Filed: July 30, 1976

[51] Int. Cl.² .............................................. G02B 5/14
[52] U.S. Cl. ......................... 350/96 GN; 350/96 WG
[58] Field of Search .... 350/96 WG, 96 GN, 175 GN

[56] References Cited

U.S. PATENT DOCUMENTS 3,617,917  11/1971  Uchida ........................... 350/96 GN
3,891,302  6/1975  Dabby et al. .................. 350/96 WG

FOREIGN PATENT DOCUMENTS 1,448,080  9/1976  United Kingdom ......... 350/96 WG

Primary Examiner—John K. Corbin
Assistant Examiner—Rolf Hille
Attorney, Agent, or Firm—Stephen M. Gurey

[57] ABSTRACT

Dispersion is reduced in a graded index optical fiber having a finite number of core layers by introducing slow longitudinal variations into the thickness of each layer. The thickness of each layer varies between maxima and minima, the latter being proximate to zero.

6 Claims, 3 Drawing Figures

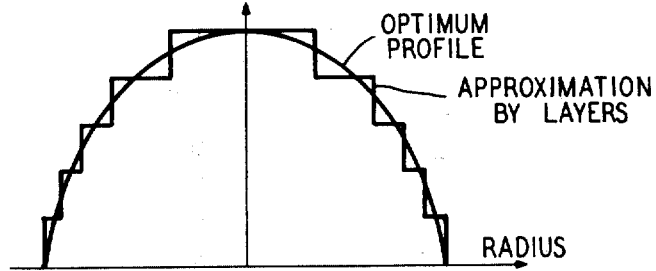
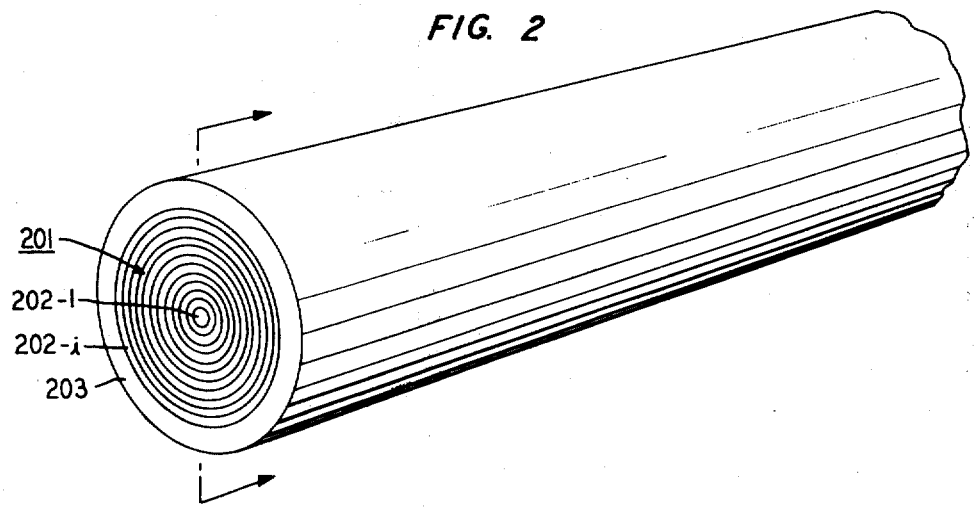
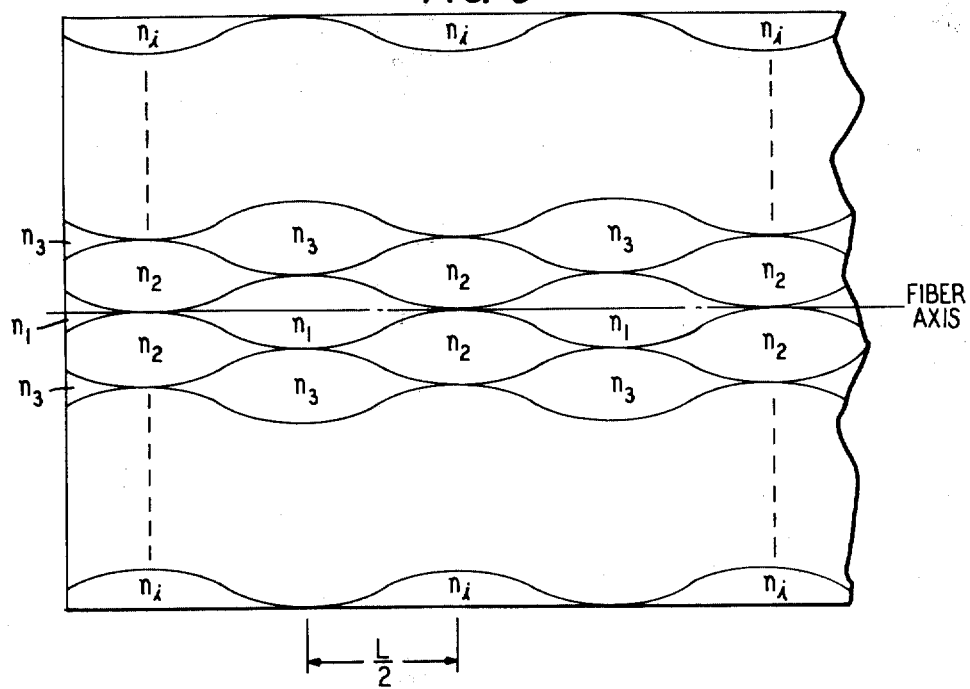

OPTICAL FIBER HAVING REDUCED DISPERSION

BACKGROUND OF THE INVENTION

This invention relates to optical fibers and, more particularly, to the reduction of dispersion in optical fibers.

In order to transmit information in the form of light pulses on an optical fiber transmission line the transmitted pulses must be individually resolvable at the receiving end of the transmission line. A light ray, however, may take different paths as it traverses the optical fiber. For example, the light ray may proceed directly down to the center of the fiber or it may be reflected off the fiber walls numerous times as it traverses the fiber. Since the distance travelled by a light ray varies on each path, each transmission mode has a different transmission time associated with it. Different paths of a light pulse may traverse the fiber in different modes and thus with different traversal times. As a result, there is a general broadening of the pulse and a consequent loss in pulse resolution.

A method for reducing dispersion in a step-index multimode fiber waveguide is disclosed in U.S. Pat. No. 3,909,110, issued Sept. 30, 1975 to D. Marcuse. As described therein, dispersion is reduced by the introduction of slight fluctuations in the refractive index of the fiber core, which fluctuations deliberately enhance coupling among the various modes in the fiber. Conditions are imposed upon the axial, azimuthal and radial dependence of the core fluctuations. The axial fluctuations take the form of slight perturbations in the refractive index and have a period of approximately 1 mm. A fiber having such small perturbations is both difficult and expensive to fabricate.

Mode dispersion can also be minimized by radially grading the index of refraction of the fiber core from a maximum at the center of the fiber to a minimum at the core-cladding interface. It has been determined that an optimum refractive index profile is parabolic in shape. A fiber with such a smooth continuous profile is not readily fabricated, and is therefore approximated by a plurality of thin cylindrical layers each having a uniform refractive index. The refractive indices of these core layers radially decrease from a maximum at the center of the core to approximate the optimum smooth profile. As can be readily appreciated, as the number of core layers increases, the smooth continuous profile is more closely approximated and the dispersion of a transmitted light impulse decreases. However, in such fibers the theoretical improvement expected from a continuous radial gradation can only be approached, and some pulse broadening still occurs. This pulse broadening increases proportional to the length of the fiber.

A graded index optical fiber such as described hereinabove is readily fabricated using a chemical vapor deposition process described in copending application Ser. No. 444,705, filed Feb. 22, 1974 and assigned to the assignee of the present invention. As described therein, a preform is formed by continuously rotating a silica tube which is traversed by a hot zone. A vapor source material such as the chlorides or hydrides of silicon together with germanium, aluminum, boron, phosphorus, et cetera, and oxygen, flows through the tube and reacts in the hot zone to produce glassy "soot" within the vapor and glass on the inner surface of the tube. For each traversal of the hot zone a cylindrical layer of glass is fused into the tube. By varying the composition of the vapor source for each hot zone traversal, a radially graded structure is formed. When the tube is collapsed and a fiber drawn therefrom, the resulting fiber has the same refractive index radial distribution as the preform. As aforenoted, many layers are necessary to approximate the impulse response of a smoothly graded optical fiber. Since the layer is to be fused separately onto the tube, the fabrication time of a preform from which a satisfactory optical fiber can be drawn is long and thus expensive.

SUMMARY OF THE INVENTION

An object of the present invention is to reduce dispersion in an optical fiber waveguide.

In accordance with the present invention, dispersion is reduced in a graded index optical fiber waveguide having a finite number of core layers by introducing longitudinal variations into the thickness of each core layer. The variations in the thicknesses of layers occur slowly along the fiber axis. In addition, the thickness of each layer varies between maxima and minima, the latter being proximate to zero.

It is a feature of the invention that the pulse dispersion of a fiber employing the present invention is less than the pulse dispersion in a prior art fiber having the same number of core layers, and increases proportional to the square root of fiber length rather than directly with fiber length.

BRIEF DESCRIPTION OF THE DRAWINGS

FIG. 1 shows the optimum smooth refractive index profile and a step approximation of the same;

FIG. 2 is a graded index optical fiber in accordance with the present invention showing the cross-section of the fiber at a point where all layers have an equal thickness; and FIG. 3 shows the relationship between the thickness of each radial layer and the longitudinal distance along the fiber axis for the fiber in FIG. 2.

DETAILED DESCRIPTION

As aforenoted, the optimum refractive index profile is a smooth parabolic function which decreases from a maximum at the center of the fiber to a minimum at the core-cladding interface. This optimum profile which gives minimum dispersion is illustrated in FIG. 1. However, a fiber having such a profile cannot be readily fabricated, but is approximated by the finite number of discrete layers which have indices of refraction that approximate the optimum profile. The approximation of the optimum profile by these discrete layers is illustrated in FIG. 1 for an illustrative five cylindrical layers. It should be noted, however, that many more layers are used to approximate the optimum profile.

As the number of layers used to approximate the smooth profile increases, the dispersion of a light pulse transmitted on the fiber decreases and more closely approximates the dispersion of a light pulse transmitted on an optical fiber having the optimum smooth profile. Since many layers are required to approximate the smooth profile satisfactorily, it is desirable to reduce the dispersion of a graded index optical fiber so that fewer layers are necessary with a resultant reduction in the cost of fiber fabrication. By employing the principles of the present invention fewer layers can be used to approximate the optimum profile. For a given number of layers, the dispersion of a light pulse transmitted on a fiber employing the present invention is less than the dispersion of a light pulse transmitted on the prior art fiber.

FIG. 2 shows an optical fiber embodying the principles of the present invention. The cross-sectional end view of the fiber is at a longitudinal point at which all layers have an equal thickness. A core region 201 includes $i$ cylindrical layers 202-1 through 202-$i$, whose individual refractive indices $n_1$ through $n_i$ decrease from a maximum $n_1$. The core 201 is surrounded by a cladding 203 having an index of refraction less than $n_1$. In accordance with the present invention the thickness of each cylindrical layer slowly fluctuates along the longitudinal axis of the fiber. FIG. 3 depicts a longitudinal cross-sectional view of the fiber in FIG. 2. As shown, the thickness of each layer periodically varies along the fiber axis between a maximum thickness and a minimum thickness proximate a zero. The maximum thickness of each layer is equal to the thickness of a corresponding layer in the aforenoted prior art discretely graded fiber. In the preferred illustrative embodiment, each layer has equal periodicity and having such, the layer are spatially arranged so that the the points of minimum thickness are spatially aligned in the longitudinal direction with points of maximum layer thickness in the immediately adjacent layers. The period, L, of the variations in layer thickness are in the range of 0.1 to 400 meters with a preferred range of 10 to 100 meters.

Although the thickness variations of each layer is shown in the preferred embodiment of FIG. 3 as being uniformly periodic, dispersion reduction can also be achieved when the thickness variations are aperiodic and the points of minimum layer thickness are not spatially aligned with the maximum layer thickness in adjacent layers. Dispersion reduction is achieved as long as the thickness of each layer is proximate to zero occasionally along the fiber axis.

The optical fiber structure of the present invention advantageously results in gross distortion of the field configuration within the fiber unlike the prior art structures which result in only minimal perturbations in the field configuration. The prior art fibers having high frequency longitudinal variations (of the order of from 1 to 10 mm) result in adiabatic mode conversion and require no cross sectional nonuniformity in the index of refraction to effect the requisite mode conversion. In the present invention, however, the low frequency longitudinal variations in layer thickness, when coupled with a nonuniform cross sectional index of refraction, yield efficient nonadiabatic mode conversion. The resulting mode conversion yields a transmitted pulse width which increases with the square root of the fiber length rather than directly with fiber length, as is the case without efficient mode conversion.

Although any nonuniformity in cross sectional index of refraction when coupled with a low frequency layer thickness, longitudinal variation is sufficient to obtain this nonadiabatic mode conversion, particular advantages result when the cross sectional index of refraction is graded from a maximum at the center to a minimum at the fiber perimeter. Under such circumstances, one gains the advantage of having both a radially graded fiber and a mode-mixing fiber in one single configuration.

The fiber of the present invention can be fabricated using the modified chemical vapor deposition process described in the aforenoted copending patent application, Ser. No. 444,705. By varying total silicon gas volume as the flame traverses along the tube during the preform fabrication, the thickness of each layer is modulated between predetermined maximum and minimum values. Alignment of the layer minimas with the maximas in the adjacent layers is achieved by spatially registering the beginning of each flame traversal together with gas flow.

The above described arrangement is illustrative of the application and principles of the invention. Other embodiments may be devised by those skilled in the art without departing from the spirit and scope of the invention.

What is claimed is:

1. A graded index optical fiber having decreased optical dispersion comprising a core member and a cladding surrounding said core member, said core member including a plurality of layers, the refractive indices of which radially decrease from a maximum at the center of the fiber, characterized in that
   the thickness of each of said layers has spatial fluctuations along the longitudinal axis of said fiber, said fluctuations occuring slowly, the thickness of each layer varying between maximum and minimum values with the minimum thickness of each of said layers being proximate to zero.

2. A graded index optical index as defined in claim 1 further characterized in that the distance between maxima in the thickness of each layer is within the range of 0.1 meter to 400 meters.

3. A graded index optical fiber as defined in claim 2 further characterized in that the distance between the maxima in the thickness of each layer is within the range of 10 meters to 100 meters.

4. A graded index optical fiber as defined in claim 1 further characterized in that said fluctuations are periodic along the fiber axis.

5. A graded index optical fiber as defined in claim 4 further characterized in that the period of said fluctuations is equal in each layer.

6. A graded index optical fiber as defined in claim 5 further characterized in that the longitudinal spatial positions of the layer thickness minima of each layer are longitudinally aligned with the thickness maxima of the adjacent layers.

* * * * *